Patented Dec. 23, 1952

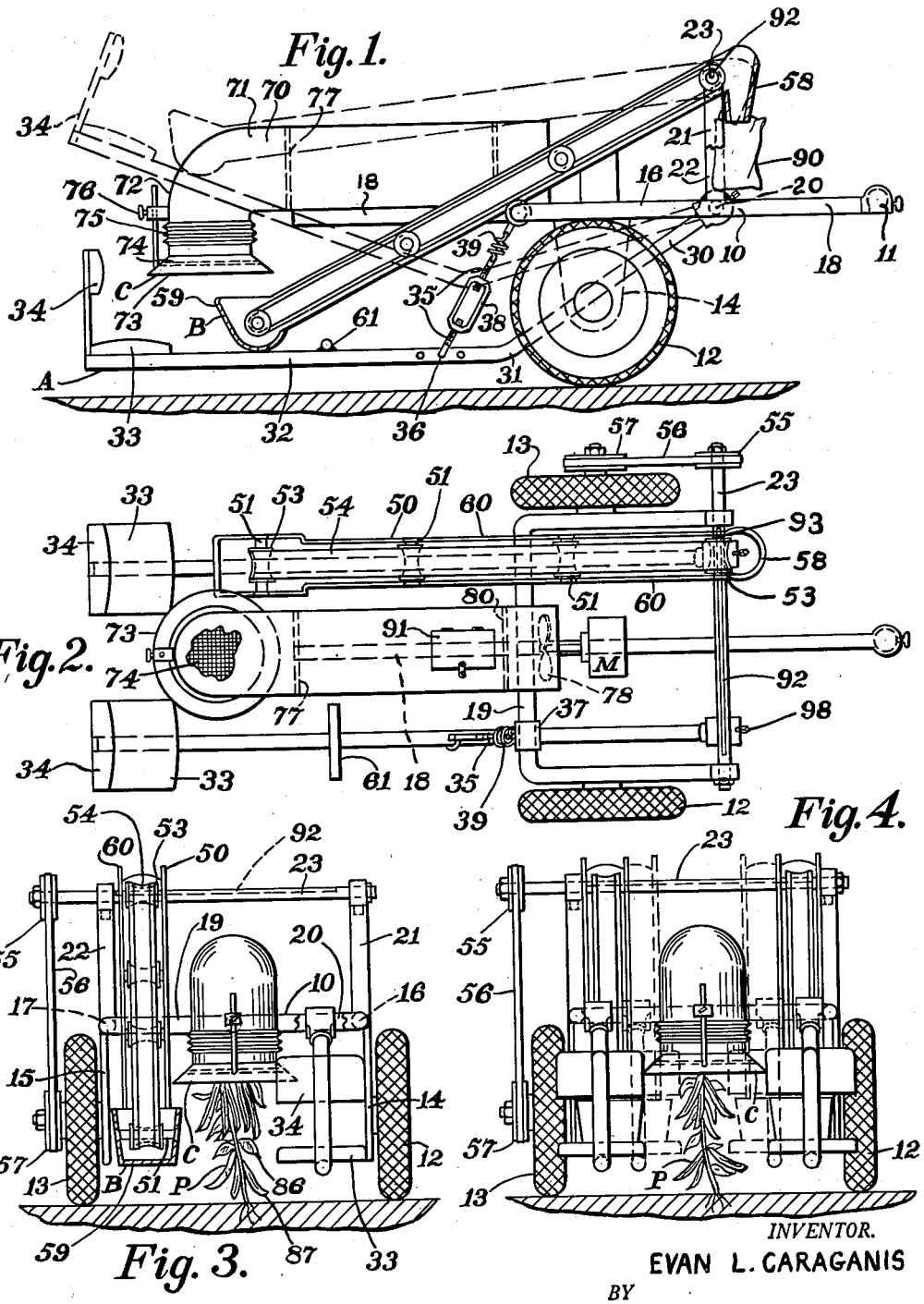

2,622,385

UNITED STATES PATENT OFFICE 2,622,385

MACHINE FOR USE IN HARVESTING

Evan L. Caraganis, Dracut, Mass.

Application May 9, 1950, Serial No. 160,933

6 Claims. (Cl. 56—327)

This invention relates to portable apparatus for use in harvesting low growing plants such as string beans or the like.

Prior portable devices for harvesting such crops have included a trailer structure having a platform, near ground level, for a standing operator and having alongside and above each platform the hopper of an endless conveyor. This has placed the hopper directly over the row of plants to be harvested, and has prevented the lifting of the foliage of the plants to uncover the crop.

An object of my invention is to overcome this disadvantage by providing on the trailer structure two rearwardly extending arms in the same longitudinal plane, one carrying a seat and the other carrying a hopper, both near ground level, and both well down between the rows of plants.

A further object of my invention is to so mount the seat supporting arm and hopper supporting arm on transverse shafts carried by the trailer that they can be lifted or lowered to various heights above ground by rotating around the shafts and can also be moved sidewise either toward or away from each other by sliding transversely on the shafts.

A still further object of my invention is to provide a power driven suction fan with a rearwardly extending duct which terminates in a substantially horizontal screened intake, adjustable in height, and located above the row of plants, between the seats and hoppers, the foliage being thereby lifted to uncover the crop and any plant pests being removed as the trailer travels above the row of plants.

Another object of my invention is generally to provide a harvesting device in which a trailer straddles a row of plants and as it moves therealong, removes and collects plant pests, lifts the foliage of the plants to expose the crop and positions a pair of operators on each side of the row, within cutting reach of the crop as well as within reach of a hopper adapted to convey the crop to collecting receptacles.

In the drawings, Fig. 1 is a side elevation, partly in section, of my new device.

Fig. 2 is a plan view of the device shown in Fig. 1, but with one endless conveyor omitted.

Fig. 3 is a rear view, partly in section, of the device shown in Fig. 1, but with one endless conveyor omitted.

Fig. 4 is a view similar to Fig. 3, showing in dotted lines various positions the parts can assume.

As shown in the drawings, 10 is a trailer, having a trailer hitch 11 of any well known type and wheels 12 and 13 carried by plates 14 and 15, which depend from side bars 16 and 17 of trailer 10. The frame structure of trailer 10 includes a central longitudinal bar 18, lateral cross bars 19 and 20, side bars 16 and 17, vertical posts 21 and 22 and an upper lateral revoluble shaft 23. The frame structure of trailer 10 may be made of channeled metal or tubular metal, but in any case, bars 19 and 20 and shaft 23 are preferably circular in cross section in as much as they also act as shafts upon which parts are pivoted and slidable.

Extending rearwardly and downwardly from trailer 10 is seat supporting means A, comprising a seat supporting arm 30, bent at 31 to form a horizontal portion 32 near, but above ground level, and carrying a seat 33 and back rest 34. Arm 30 is rotatably mounted on shaft 20 so that it can be raised to various heights above the ground, or moved out of the way when not in use, as shown in dotted lines in Fig. 1. Arm 30 is also slidable transversely on shaft 20, in order that it may be moved toward or away from the row of plants as desired. A flexible hanger or brace 35 connects an intermediate portion of 30, as at 36, to a sleeve 37 slidable on cross bar 19 of the frame of trailer 10 and includes a threaded adjusting nut 38 as well as a spring 39 to vary its length and take up shocks. An arm 30 is positioned near each end of shaft 20 to permit an operator to work on each side of the row of plants straddled by the trailer. If desired, a set screw 98 may be used to hold arm 30 in a particular position on shaft 20.

Extending rearwardly and downwardly from transverse shaft 23 of trailer 10 is hopper supporting means B, comprising an endless conveyor supporting arm 50, including a pair of elongated side guides 60. Pulley shafts 51 are journalled in each guide 60 and spaced therealong, each carrying an endless conveyor pulley 53. A flexible conveyor belt 54, of U shape in the center, travels the length of arm 50 on pulleys 53, the pulleys 53 on shaft 23 each having a key 93 operating in key slot 92. The belt is actuated by a pulley 55 on an end of shaft 23, which is driven by belt 56 and a pulley 57 on a wheel such as 13. A discharge spout 58 is provided at the upper end of arm 50. A receiving hopper 59 is provided at the lower end of arm 50, the side guides 60 being rotatably supported on shaft 23, but being connected by the shafts 51 and the spout and hopper. The bottom of hopper 59 rests on part 32 of 30 just in front of seat 33 and is thus between the legs of the operator, while the operator's feet are supported by the foot bar 61.

Arm 50 is thus rotatably mounted on shaft 23 and can be raised and lowered as arm 30 is raised and lowered, while the hopper still remains between the legs of the operator or arm 50 can be moved up out of the way as shown in dotted lines in Fig. 1. Arm 50 is also slidable transversely on shaft 23, the shaft and conveyor continuing to revolve regardless of the transverse position assumed by the conveyor arm.

The suction means C of my invention comprises an air duct 70 fixed to the center of trailer 10 and extending rearwardly at 71 and then downwardly at 72 to a substantially horizontal intake at 73. Intake 73 is thus in the center of the trailer 10, directly over the row of plants P, straddled by the trailer, and has below it on each side, a seat 33 and a hopper 59. A screen 74 is mounted in intake 73, with suitable mesh to allow the passage of plant pests but prevent the passage of plant foliage or produce. Accordion pleats 75 are also provided between intake 73 and 72 to permit the height of 73 to be varied by a set screw 76. A damper 77, of a well known type, is provided to adjust the amount of suction produced by a suction fan blade 78 mounted in duct 70 and powered in any convenient manner such as by a gasoline motor M mounted on trailer 10.

A collecting screen 80 of finer mesh than 74 may be affixed near the discharge end of duct 70 to retain any plant pests sucked from plants P and is accessible through trap door 91. Similarly collecting receptacles such as bags 90 are affixed to the discharge end of spouts 58, and supported thereby, until full when they are removed and a new bag substituted therefor.

In operation, my device is attached to a tractor by trailer hitch 11 and the intake 73 and screen 74 of suction means C are placed at the proper vertical height to permit suction from fan 78 to raise the foliage 86 of plants P and expose the crop such as beans 87. Depending on the width of the row of plants P in the particular field being harvested, the arm 30 of each seat supporting means A, together with hanger 35 and sleeve 37 is slid transversely toward or away from plants P to place the operator within cutting or picking reach. If one operator requires greater height or depth than the other or if the trailer is on a hillside, the arms 30 can be suitably adjusted by tightening nut 38 on hanger 35 to change the vertical distance of a seat 33 above the ground. Since each hopper 59 rests on an arm 30, it will automatically assume the correct relationship above the ground with its arm 30 and seat 33 and can be slid transversely on shaft 23 to the transverse location of its arm 30.

Motor M is then placed in operation, causing fan 78 to commence lifting foliage 86, exposing crop 87 and removing pests from the row of plants P. As the trailer moves forward, drawn by the tractor, each operator seated in seats 33 cuts the exposed crop on his side of the plant, drops it into hopper 59 from which conveyor belt 54 powered by wheel 13 carries it to spout 58 and bags 90. When the harvesting operation is complete, the seats and hoppers may be raised to the position shown in dotted lines in Fig. 1 in order that the trailer may safely be drawn along the highways to the next field. Any plant pests collected on screen 80 in duct 70 may be removed through trap door 91.

I claim:

1. A portable device for use in harvesting crops from low growing plants, comprising a trailer structure adapted to straddle a row of said plants; a pair of seat-carrying arms each extending downwardly and rearwardly from said structure on an opposite side of said plant row and each having a seat above but near ground level; a pair of endless conveyor arms each extending downwardly and rearwardly from said structure on an opposite side of said plant row, each conveyor arm having a discharge spout at the upper end and a crop receiving hopper at the lower end, and each hopper being located in front of a seat near ground level; and power driven suction means, mounted on said structure, having an intake screen located above said plant row between said seats and hoppers said suction means being adapted to lift the plants in said row proximate the seats and hoppers.

2. A wheeled structure for use in harvesting crops from rows of substantially aligned low growing plants, comprising a seat for an operator carried by the structure and positioned between adjacent rows of plants near ground level; an endless conveyor, carried by the structure, having its receiving end positioned near ground level and aligned with said seat and suction means, carried by the structure, having a suction screen aligned with and above the level of the foliage of a row of plants, said screen being proximate the seat and the receiving end of the endless conveyor.

3. A portable device for use with low growing crops, comprising a trailer structure adapted to straddle a row of plants; means for supporting an operator's seat near ground level on each side of said plant row, said means being vertically pivoted to, and transversely slidable on, said trailer structure; means for supporting a hopper near ground level, in front of each seat, said means being vertically pivoted to, and transversely slidable on, said trailer structure, and power driven suction means depending from said structure above said plant row and having a vertically movable intake screen adjustably positioned above and between the seat and hopper on each side of the plant row.

4. A device according to claim 1 wherein said seat carrying arms and said endless conveyor arms are mounted on said trailer structure for lateral sliding and vertical pivoting toward and away from the intake screen of said power driven suction means.

5. A device according to claim 1 wherein the upper ends of said seat carrying arms and said endless conveyor arms are pivoted to said trailer structure for rotation in a vertical plane, the lower end of each endless conveyor arm is supported on the adjacent seat carrying arm and the lower end of each seat carrying arm is adjustably and resiliently supported from said trailer structure.

6. A device according to claim 1 wherein said power driven suction means includes a screen, of finer mesh than said intake screen, positioned within the suction means in rear of the intake screen.

EVAN L. CARAGANIS.

REFERENCES CITED

The following references are of record in the file of this patent:

UNITED STATES PATENTS

| Number | Name | Date |
|---|---|---|
| 823,034 | Combee | June 12, 1906 |
| 1,130,977 | Cook | Apr. 25, 1916 |
| 1,347,733 | Davis | July 27, 1920 |
| 1,578,423 | Gibson et al. | Mar. 30, 1926 |
| 1,844,750 | Ellis | Feb. 9, 1932 |
| 2,395,124 | Jelderks | Feb. 19, 1946 |
| 2,427,746 | Sawtell | Sept. 23, 1947 |
| 2,511,940 | Platt et al. | June 20, 1950 |